United States Patent [19]

Hayami et al.

[11] 4,020,502
[45] Apr. 26, 1977

[54] METHOD AND APPARATUS FOR SEPARATING, COMBINING AND REARRANGING COLORED IMAGES

[75] Inventors: Heijiro Hayami; Hiroaki Kotera; Hiroyoshi Tsuchiya; Ryuzo Kan; Kunio Yoshida; Tsutomu Shibata; Yukifumi Tsuda, all of Kawasaki, Japan

[73] Assignee: Matsushita Electric Industrial Co., Ltd., Japan

[22] Filed: Oct. 10, 1975

[21] Appl. No.: 621,533

[30] Foreign Application Priority Data

Oct. 14, 1974 Japan .............................. 49-119101

[52] U.S. Cl. .................................................. 358/80
[51] Int. Cl.$^2$ ...................... H04N 9/10; G03F 3/00
[58] Field of Search ............................. 358/78, 80

[56] References Cited

UNITED STATES PATENTS 3,934,083   1/1976   Plath .............................. 358/78 X Primary Examiner—Robert L. Richardson
Attorney, Agent, or Firm—Robert E. Burns; Emmanuel J. Lobato; Bruce L. Adams

[57] ABSTRACT

A colored original which is painted with a plurality of predetermined colors is scanned along each of a plurality of line paths each of which can be divided into one or more colored line segments. Encoders are provided to characterize each of the line segments by a corresponding first code representing the color of the segment and a second code representing the run length of the segment. The first and second codes are sequentially recorded in a data file memory. The recorded information is repeatedly retrieved from the memory and transferred to a shift register. Line segments carrying the same color within each line path are detected by comparing the corresponding first code with a specified code. The second code is sequentially decoded into run lengths which are accumulated to measure the position of color transitions relative to the colored original. A video signal is generated upon occurrence of coincidence between the first code and the specified code. A photographic film is scanned by a light beam modulated with the video signal to develop an image carrying the detected color on a specified portion of the film in correspondence with the specified code. The codes to be specified are sequentially changed to detect the line segments of different colors in a predetermined sequence within the period of the scanning. In synchronism with the code change, the shift register is shifted to recirculate the data.

7 Claims, 15 Drawing Figures

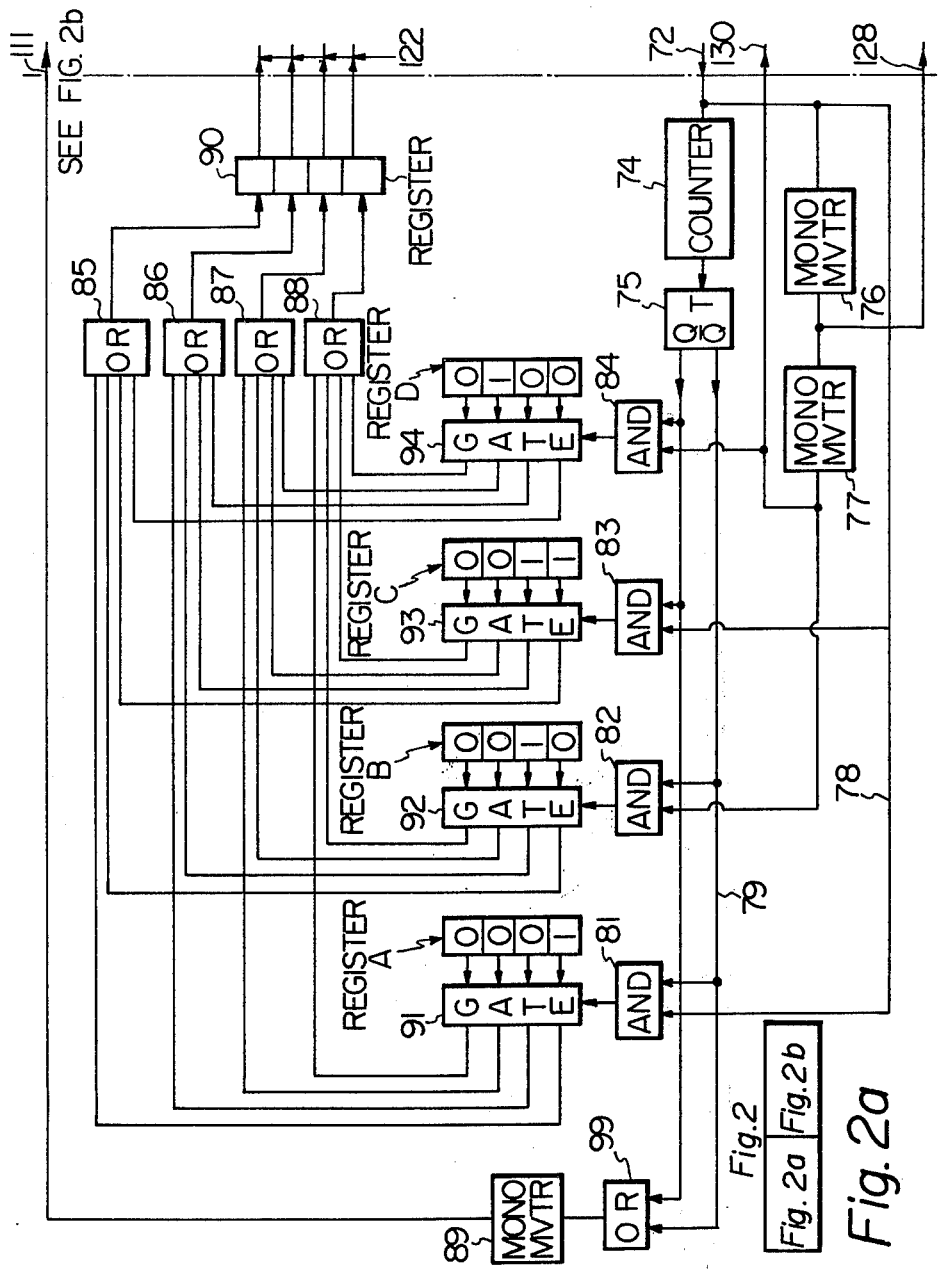

(a)

(b)

(c)

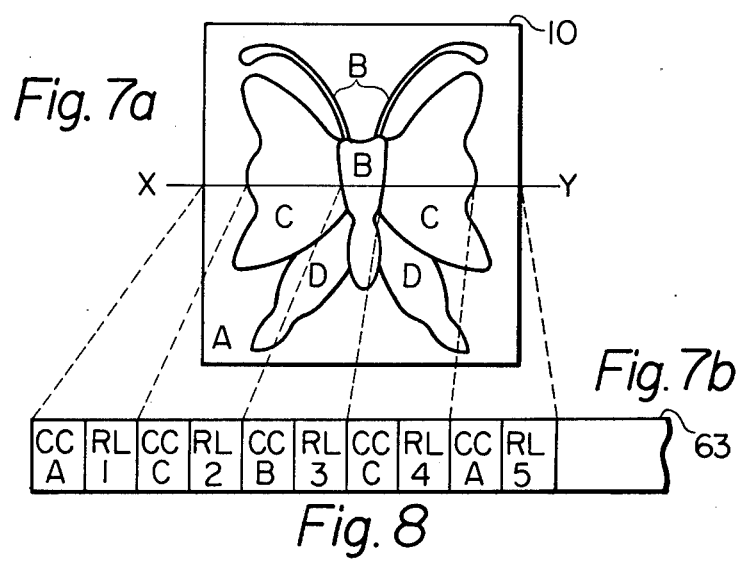
Fig. 7a
Fig. 7b
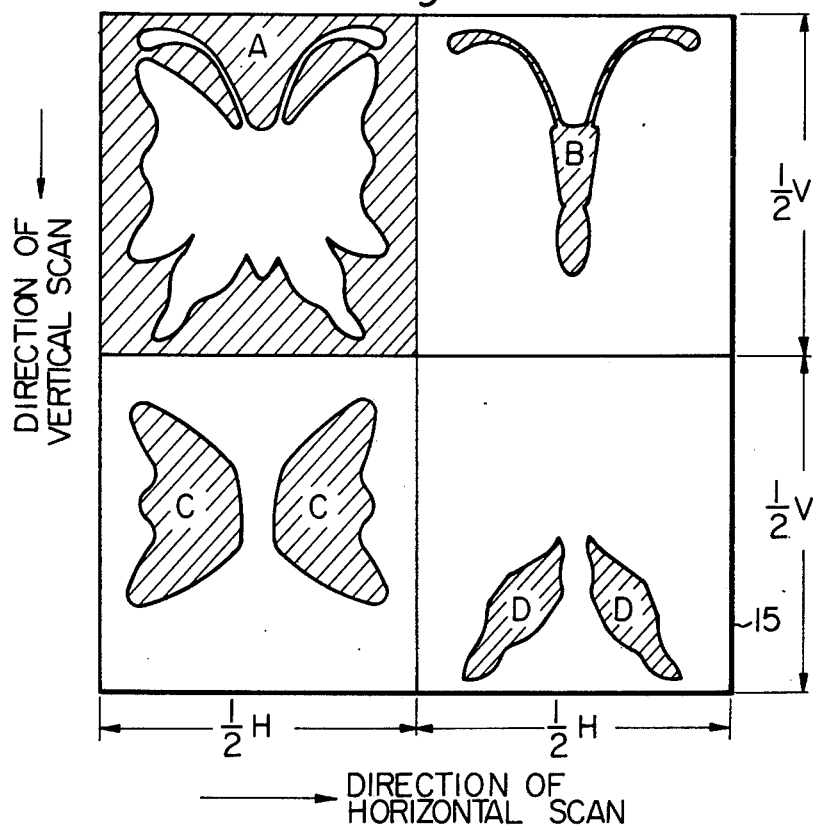
Fig. 8

METHOD AND APPARATUS FOR SEPARATING, COMBINING AND REARRANGING COLORED IMAGES

BACKGROUND OF THE INVENTION

The present invention relates generally to electronic printing processes and more specifically to a method and apparatus for electronically separating a colored original into a plurality of images.

In the cloth printing process, a colored original is separated into images carrying one of the colors of the original. The separated images are used to provide a printing pattern with which a sheet of cloth is printed. In a prior art printing process, the separated images are developed in separate photographic films, thus needing as many photographic films as the number of colors used in reconstructing the original image. Since the separated images were developed on separate films, the size of the films must be equal to each other in order that they exactly overlap one upon another. Because the film must be dimensioned to accommodate the maximum size of the separated images, most of the separated images occupy only a portion of the entire area of the film, thus resulting in wastage of film.

A primary object of the invention is therefore to reduce the wastage of photographic films by developing separated images on different areas of a single film.

A further object is to provide an improved method and apparatus in which a colored original is recorded in the form of coded signals and means are provided to selectively detect particular code signals in a predetermined sequence as the recorded information is being retrieved.

In accordance with the invention, a colored original which is painted with a plurality of predetermined colors is first scanned along each of the plurality of line paths within the original to detect the light reflected therefrom. The detected light is then separated into three light beams of one of the three primary colors and the separated beams are each converted into corresponding electrical signals which are in turn compared with a set of reference voltages derived from color samples carrying the same colors as used in painting the original. Each of the line paths so scanned is divided into a plurality of line segments carrying one of the colors in the original. The line segments are each translated into a first characterizing code which represents the color of the segment and a second characterizing code which represents the length of that segment, or the time between transitions of colors along the line path. These first and second characterizing codes are recorded in sequence in a recording medium such as a magnetic tape. In the subsequent process, the recorded information is transferred to a shift register. The shift register is shifted in such manner to decode a set of first and second characterizing codes at one time. A first-code detector is provided to selectively detect the first code representing the same color within the line path. A scanner is provided to scan across the surface of a photographic film. The second code is decoded into the length of each line segment to measure the position of color transitions from the start of each line. Only those line segments which are characterized by the detected first code are recovered. The first code of the non-recovered line segments are subsequently detected by recirculating the binary data in the shift register, and recovered on a separate portion of the film.

The present invention can be used to develop an image of the same pattern in different areas of a photographic film by repeatedly detecting the same first code, and modified to synthesize a new image by superimposing a plurality of images.

BREIF DESCRIPTION OF THE DRAWINGS

The invention will be further described by way of example in connection with the accompanying drawings, in which:

FIG. 5 is a waveform diagram showing pulse waveforms associated with the circuit of FIG. 2a;

FIG. 7 is an exemplary colored original showing a line X-Y along which the original is being scanned and the relationship between the line segments and the associated characterizing codes;

FIG. 8 shows a set of four images derived from the original of FIG. 7 developed on separate portions of a single photographic film;

DESCRIPTION OF THE PREFERRED EMBODIMENTS

Figure 1:
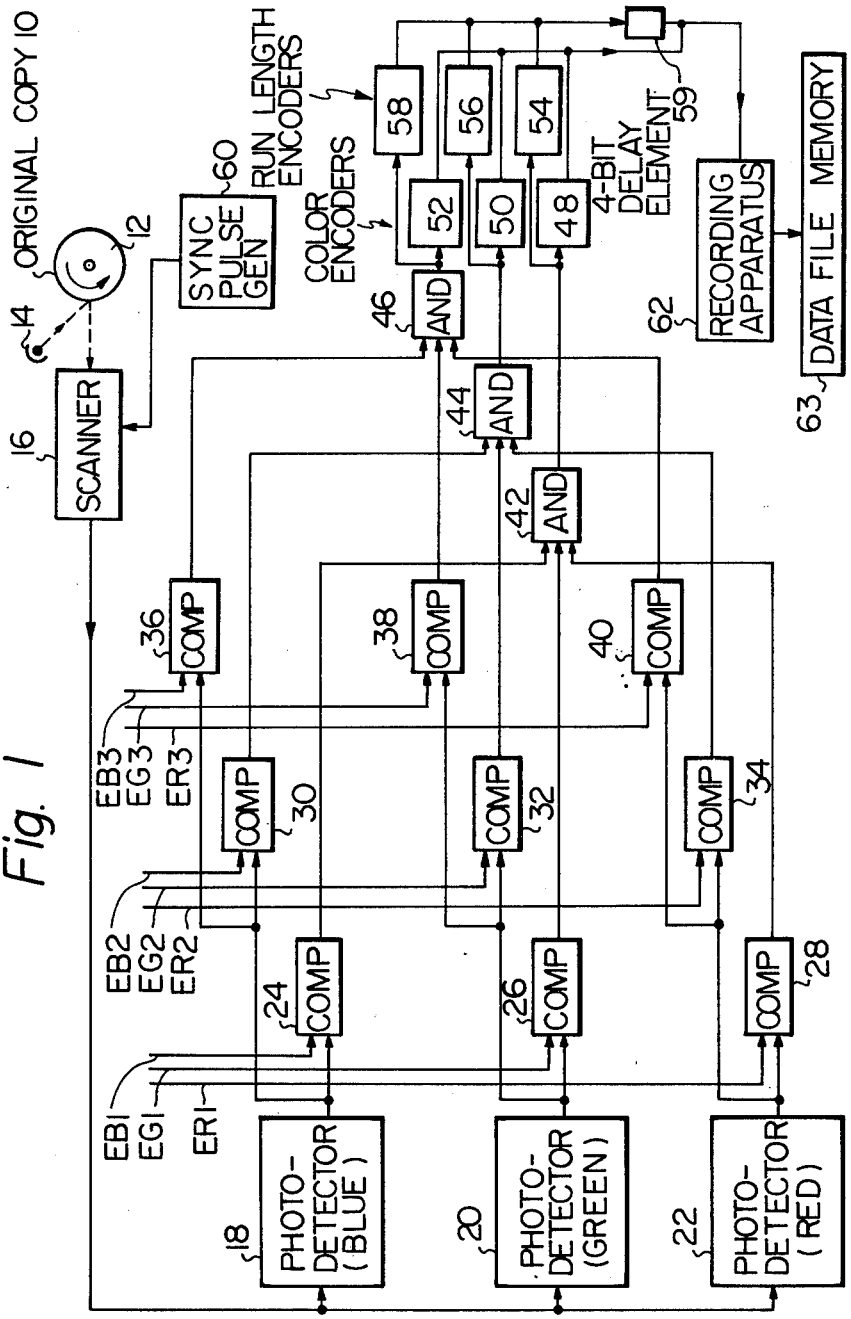
FIG. 1 is a circuit diagram of a video encoder of the invention.
Figure 4:
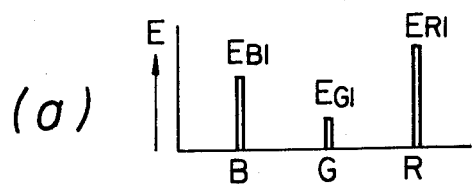
FIG. 4 is a diagram showing various reference voltages derived from three color samples each carrying one of the colors used in painting a colored original.
Figure 4:
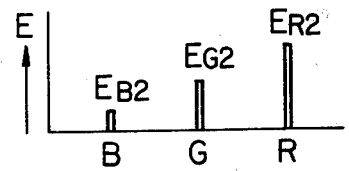
Figure 4:
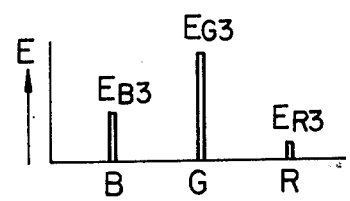

Referring now to FIG. 1 a general schematic circuit diagram of a video encoder of the present invention is shown. An original copy 10 which has been printed by a well known method using a plurality of predetermined colors is wound around the surface of a revolving drum 12 and subjected to a beam of light emitted from a light source 14 mounted on a scanner 16 to scan the surface of the copy 10 in a horizontal direction normal to the direction of rotation of the drum 12. The scanner 16 is provided with an optical system (not shown) to transmit the light reflected from the copy 10 to photodetectors 18, 20 and 22. The optical system may be an arrangement of half-silvered mirrors disposed in the passage of the reflected light to deflect it into separate paths. The photo-detectors 18, 20, 22 may be constructed of light filters for passing light of blue, green and red, respectively, disposed in the respective passages of light separated by the half-silvered mirror arrangement, and photo-transistors (not shown) placed behind the respective color filters to detect the intensity of the primary three color components of the reflected light. The output circuits of the photodetectors 18, 20, 22 are coupled to a first set of comparators 24, 126 and 28, and to a second set of comparators 30, 32 and 34, and further to a third set of comparators 36, 38 and 40. The comparators 24, 30 and 36 have their one input terminals connected in parallel to the output of the detector 18, the comparators 26, 32 and 38 having their one input terminals connected in parallel to the output of the photodetector 20, and the comparators 28, 34 and 40 having their one input terminals connected in parallel to the output of the detector 22. In the comparators 24, 26 and 28 the outputs from the photodetectors 18, 20 and 22 are respectively compared with reference voltages $EB_1$, $EG_1$ and $ER_1$. These reference voltages are generated prior to the scanning of the original copy 10 by scanning a color sample No. 1 which is one of the colors used in printing the original copy 10, as shown in FIG. 4a. If each of the output voltages from the photo-detectors 18, 20, 22 is the same as the corresponding reference voltage, a coincidence output will be produced at the output of comparators 24, 26 and 28. The outputs from the comparators 24, 26, 28 are connected to an AND gate 42. Therefore, the AND gate 42 provides an output only when coincidence occurs in all of the comparators 24, 26 and 28.

In like manner, colors samples Nos. 2 and 3 are also provided and scanned by the scanner 16 as in the manner previously described to provide electrical outputs as shown in FIGS. 4b and 4c. The output from the color sample No. 2 is applied to the second set of comparators 30, 32 and 34 and the output from the color sample No. 3 is applied to the third set of comparators 36, 38, and 40. The output of the second set of comparators is coupled to an AND gate 44 so that it provides an output only when the detector outputs are in coincidence with the reference voltages $EB_2$, $EG_2$ and $ER_2$. Likewise, the output of the third set of comparators 36, 38 and 40 is connected to an AND gate 46 so that it provides an output only when the detector outputs are in coincidence with the reference voltages $EB_3$, $EG_3$ and $ER_3$.

The number of color samples the colors of which are used in printing the original copy 10 can be increased as desired by providing additional sets of comparators and AND gates.

Since the original copy 10 is printed with the colors of the color samples Nos. 1 to 3, the light reflected from a given point of the surface of the copy 10 is analyzed as being one of the sets of reference voltages, i.e. voltages $EB_1$, $EG_1$, or $EB_2$, $EG_2$, $ER_2$, or $EB_3$, $EG_3$, $ER_3$. The AND gate 42 feeds its output to a color encoder 48 which translates the input color signal representing the color as same as the color sample No. 1 into a first code consisting of four binary digits, for example, 0001. Simultaneously, the output from AND gate 42 is applied to a run length encoder 54. As the copy 10 is being scanned along a given line path, the image on the line path can be considered as having a plurality of segments each bearing one of the colors as referred to above. The run length encoder 54 translates the length of the segment bearing the color of sample No. 1 into a run length code consisting of 12 binary digits. Similarly, the AND gate 44 couples its output to a color encoder 50 to translate the corresponding line segments into a four bit code (for example, 0010), and further coupled to a run length encoder 56 in which the length of the segments is translated into a 12-bit run length indicating code. Color encoder 52 and run length encoder 58 are also connected to the output of AND gate 46 to achieve the same purpose as described above with respect to line segments bearing the color of sample No. 3.

It will be understood that each of the line segments bearing different colors is characterized by the color indicating four bit code and the run length indicating 12-bit code. It will noted that there are as many color encoders and run length encoders as are necessary for the number of colors used in the original printing.

The outputs of the run length encoders 54, 56, 58 are connected in common to a four-bit delay element 59 and the outputs of color encoders 48, 50, 52 are connected in common to the output of the delay element 59. The 12-bit run length code is thus delayed by four bits so as to allow the four-bit color code to precede the run length code.

The scanner 16 is synchronized with the pulses supplied from a synchronizing pulse generator 60 so that it starts scanning with the synchronizing pulse and returns to the starting position automatically at the end of each line scan. At the beginning of each line scan, a synchronizing pulse from the source 60 is applied to the output of four-bit delay circuit 59 to precede the first color indicating code derived from each line scan so that the signal at the beginning of each line scan is identified for reasons as will be described below.

The coded information is applied to a data recording device 62 such as a magnetic tape recording apparatus which records the input information on a magnetic tape as in the usual manner of magnetic recording. The magnetic tape will be used later as a data file memory for decoding the information contained therein to separate the original image into patterns of different colors.

FIG. 7a shows an exemplary pattern of colored original 10 which in this case is printed with four distinct colors A, B, C and D. When copy 10 is scanned across line X–Y, the signal stored in the data file memory 63 will contain five run length codes RL-1 to RL-5 precoded by color indicating codes CC-A, CC-C, CC-B, CC-C and CC-A, respectively. The line segment A on the line X–Y is thus characterized by the codes CC-A and RL-1 represented by the total of 16 bits, the segment C which follows the segment A is characterized by the codes CC-C and RL-2, and so on.

Figure 5:
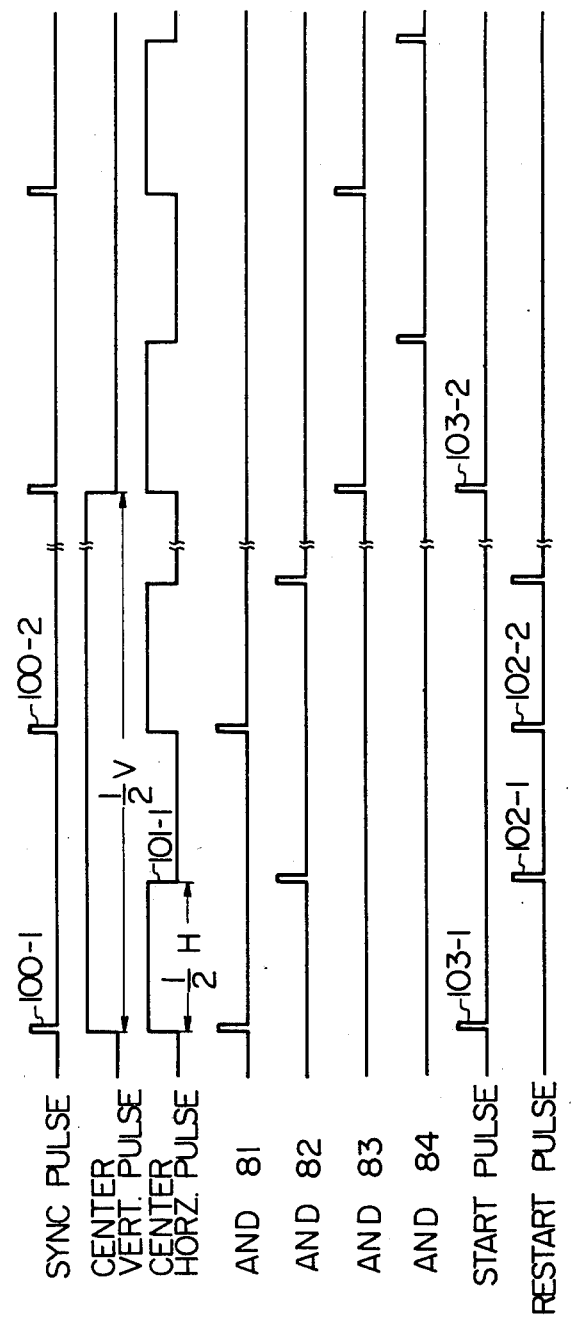

The data file memory 63 is then used to break down the colored original into separate images each carrying one of the distinct colors A, B, C and D. In order to achieve color separation, reference is had to the circuit of FIG. 2 in connection with FIGS. 5 and 6.

In FIG. 2, colors A, B, C and D of FIGS. 7 and 8 are represented by four binary digits in registers A, B, C and D, respectively. A synchronizing pulse generator 70 provides synchronizing pulses 100 on lead 72 to a counter 74, to a set of cascaded monostable multivibrators 76 and 77 and further to AND gates 81 and 83 by way of lead 78. The synchronizing pulses 100 are also applied to a horizontal sweep generator 96 and a vertical sweep generator 97 which produce deflecting voltages necessary to cause a scanner 98 to scan across the surface of a photograhic film (not shown). A flip-flop 75 is connected to the output of counter 74 so that it produces a high level output at the $\overline{Q}$ terminal before counter 74 provides a low level output to the T input terminal of the flip-flop. This high $\overline{Q}$ output is coupled to the AND gate 81 and 82 by way of lead 70. This enables the AND gate 81 and activates gate 91 to pass the binary digits 0001 in register A to an output color code register 90 via OR gates 85, 86, 87 and 88. Thus, the register 90 is loaded with binary digits 0001 representing color A. This stored information will be changed in a predetermined time sequence to the next binary information stored in registers B, C and D, to be described below.

A synchronizing pulse 100-1 on lead 72 causes the monostable multivibrator 76 to produce a center horizontal pulses 101 having a duration of one half the interval between successive synchronizing pulses. Monostable multivibrator 77 produces an enabling pulse 102 at the trailing edge of the pulse 101. Since the $\overline{Q}$ output of flip-flop 75 remains high, the AND gate 82 is caused to open its gate to activate gate 92 to transfer the bianry digits 0010 in register B to the output register 90. This change of binary digits in register 90 occurs at the midpoint of a line scan which is synchronized with the pulses 100. This binary information in the output register 90 is stored until the beginning of the next line scan when the AND gate 81 is enabled again by the next synchronizing pulse 100-2. It will be noted that the output register 90 is alternately loaded with the binary digits of registers A and B during the first and second half periods of each line scan. This process will be continued until the vertical scan reaches its midpoint. The midpoint on the vertical scan is detected by the counter 74. The counter 74 provides a high level output when it counts half as many synchronizing pulses 100 as required to scan a complete field. The counter output causes the flip-flop 75 to change its state and the Q terminal goes high. This enables AND gate 83 to pass the next synchronizing pulse 100-3 to gate 93 to transfer binary digits 0011 in register C to the output register 90. In a manner similar to that described above in connection with the first half period of the vertical scan (during which images A and B are scanned), AND gates 83 and 84 are alternately activated to change the binary digits in the output register 90 during the second half period of the vertical scan so that images C and D are produced on the photographic film.

It will be noted that the circuit of FIG. 2a can be modified to meet specific requirements, i.e. the number of colors to be separated and the arrangement of the separated images on the photographic film. Such modification is apparent to those skilled in the art of logic circuitry.

Figure 2B:
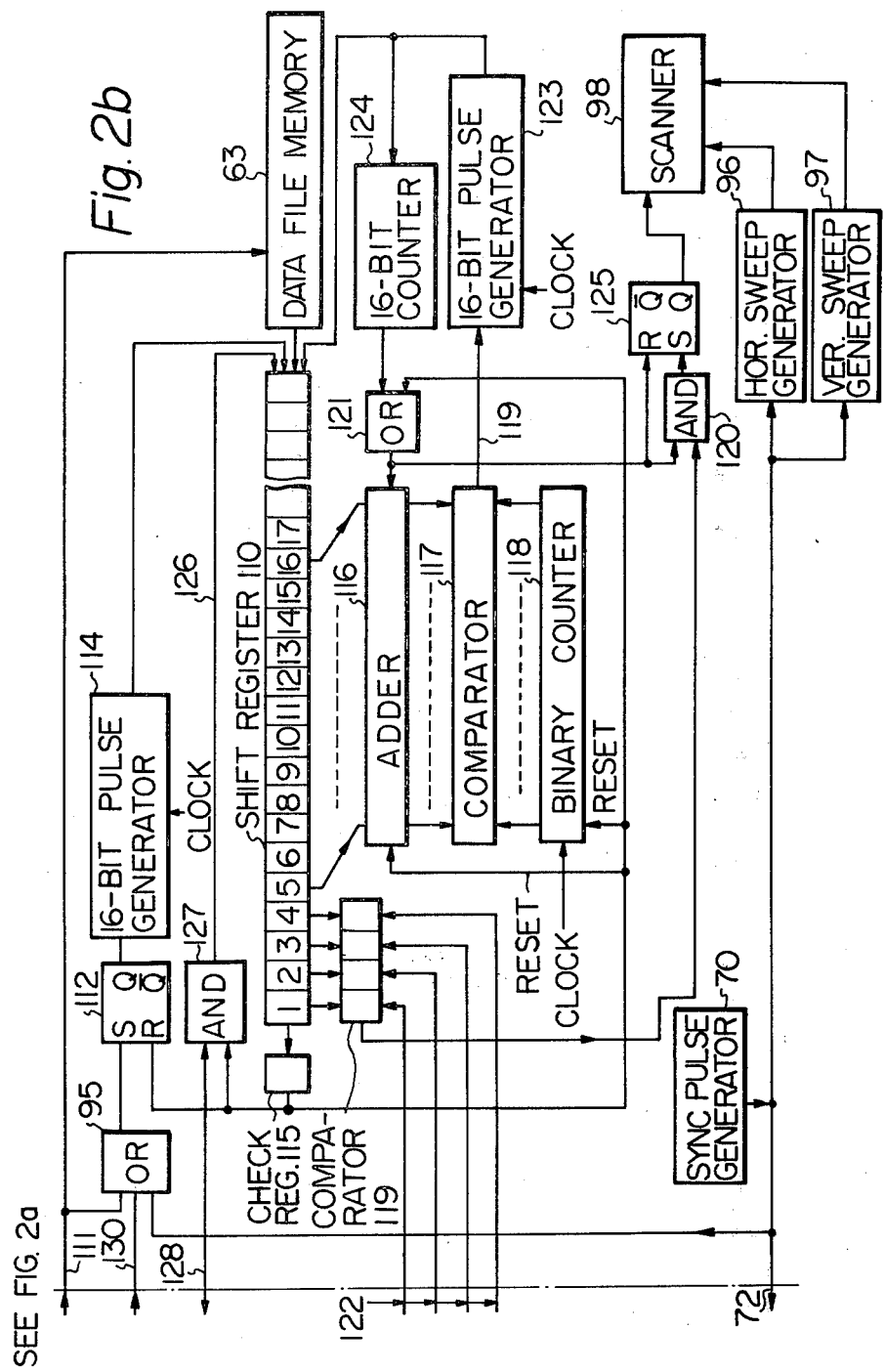
FIG. 2 is a circuit diagram of a video decoder of the invention.
Figure 6:
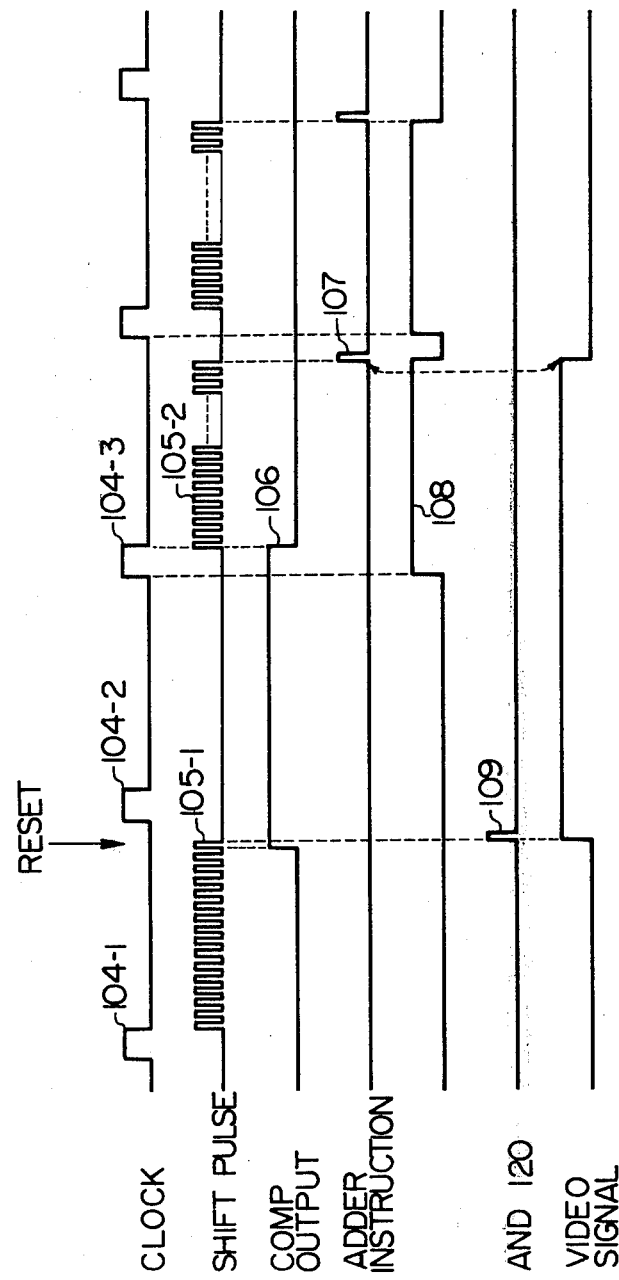
FIG. 6 is a waveform diagram showing pulses waveforms associated with the circuit of FIG. 2b.

The output terminals of flip-flop 75 are connected to a monostable multivibrator 89 to produce a start command signal 103 at the start of a field scan at the center of vertical scan. A start command signal 103-1 is produced by the high $\overline{Q}$ output of flip-flop 75 at the time the sync pulse 100-1 occurs. This start signal is tranmitted by way of a lead 111 to the data file memory 63 and to the set terminal of flip-flop 112 via OR gate 95 (FIG. 2b). The high level Q on flip-flop 112 enables a 16-bit pulse generator 114 to provide a train of 16 pulses 105-1 in synchronism with a clock pulse 104-1 (FIG. 6). The binary data stored in the data file memory 63 is thus loaded into a shift register 110 capable of storing the data of one complete line. When a complete line data is placed in the shift register 110, a check register 115 will produce an output which resets the flip-flop 112 to disable the pulse generator 114. The output from the check register 115 is also used to reset an adder 116 and a binary counter 118 and enable an AND gate 120 via OR gate 121. With the shift register 110 being loaded with first 16 binary digits, the binary digits in the first to fourth bit positions are compared with the binary digits in the output code register 90 by way of leads 122 by means of a comparator 119, in this case 0001. The comparator 119 produces a coincidence output 106 when the first four bit are 0001 and sets the flip-flop 125 to produce a high level at the Q output.

The check register output through OR gate 121 cuased the adder 116 to transfer the binary digits in the 5th to 16th bit positions thereto. The binary counter 118 upon reset started to count clock pulses. A comparator 117 is connected to the adder 116 at one input side and to the binary counter 118 at the other input side to provide a bit for bit coincidence test between the two binary digits in the adder and the binary counter. Assume that the first run length is 2, a coincidence occurs when counter 118 counts two clock pulses 104-2 and 104-3. The comparator 117 produces an output 108 on lead 119 which enables a pulse generator 123 to produce a train of 16 pulses 105-2 at the falling edge of clock pulse 104-3. A counter 124 is connected to the output of the pulse generator 123 to provide an output 107 when it counts 16 pulses. The shift register 110 is shifted and the next 16 binary digits are placed in the first 16 bit positions. The pulse 107 is applied to the adder 116 via OR gate 121 to cause the adder to accept the new 16 binary digits which are added up to the previous information. The pulse 107 is also applied to the reset terminal of flip-flop 125 so that its Q output goes low. The high level signal on the Q output of flip-flop 125 thus represents a video signal corresponding to the first line segment on line X–Y of FIG. 7a carrying color A and represented by run length 2. The video signal is received by the scanner 98 which reproduces the first line segment on the photographic film.

With the shift register 110 being loaded with the second 16 binary digits, the comparator 119 provides no signal at this time since the second line segment on the line X–Y carries color C. Therefore, AND gate 120 is not enabled and no video signal is delivered at the Q output of flip-flop 125. However, the binary counter 118 continues counting. Assume that the second run length is 5, coincidence occurs when the contents of the binary counter 118 equal 7 (= 2 + 5).

Similar process will continue until the first 16 binary positions of the shift register 110 are loaded with the fifth line segment data which carries color code CC-A and run length code RL-5. Thus, during a first half period of the line scan, an image carrying color A is scanned. During this first half line scan period, a complete line data has been shifted and recirculated through a loop 126 via an AND gate 127 which is enabled by the center horizontal pulse 101-1 supplied from monostable multivibrator 76 by way of lead 128. At the center of the line scan, monostable multivibrator 77 produces an output as previously described. This permits the output color code register 90 to replace its binary contents with those in register B. The output from multivibrator 77 is represented by a pulse 102-1 and applied to the set terminal of flip-flop 112 by way of lead 130 and OR gate 95. Since the number of binary digits for each line data varies in accordance with the number of line segments in each line path, the shift register 110 should be provided with a sufficient number of bit positions for the storage of maximum number of binary digits. For this reason, the pulse 102 is necessary to shift the first 16 bits of the recirculated line data to the first to 16 bit positions of the shift register 110. Therefore, it will be understood that the same process will be repeated in the second half line scan period except that color code 0010 representing color B is selected so that line segment on line X-Y represented by color code CC-B and run length code RL-3 is scanned on the photographic film and that the stored bits in shift register 110 are not recirculated through the loop 126.

The line synchronizing pulses 100 from source 70 are also applied to the set terminal of flip-flop 112 via OR gate 95 so that at the start of subsequent line scan, the pulse generator 114 is enabled again to permits the shift register 110 to be reloaded with the next line data.

The above-described process will be repeated until the counter 74 counts as many pulses as necessary to scan a complete field. During the first half period of the vertical scan (field scan), images A and B are thus reproduced separately on different areas of the surface 15 (FIG. 8). At the center of the vertical scan, the the counter 74 provides an output which causes flip-flop 75 to change its state so that $\bar{Q}$ output goes high. This high output is connected to the monostable multivibrator 89 via OR gate 99 to produce a restart signal 103-2. The restart signal is applied over lead 111 to the data file memory 63 to cause it to unload the stored information starting at the first line data as is done at the start of the field scan. The 16-bit pulse generator 114 is also enabled to shift the unloaded information to the shift register 110. The same process will be repeated as has been described in the first half period of the field scan except that color codes C and D are selected in alternate fashion during first and second half line scan periods to reproduce image C and D on separate areas of the surface 15.

Figure 3:
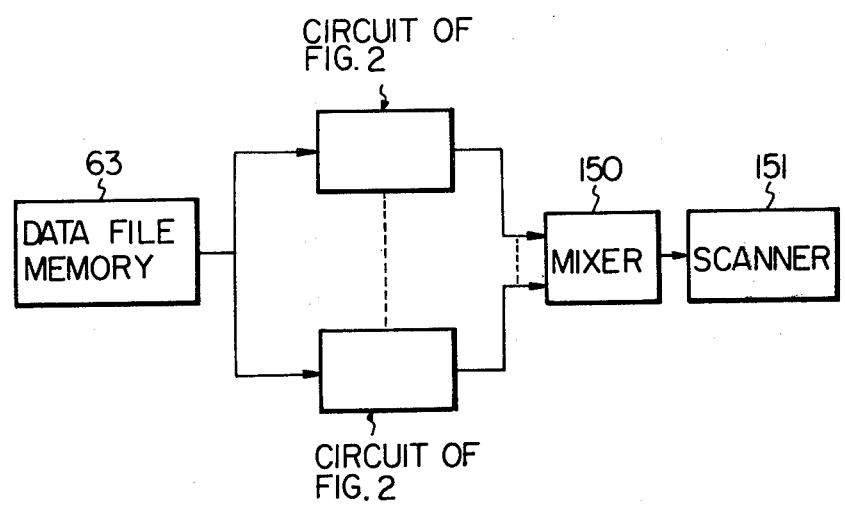
FIG. 3 is a modified form of the invention utilizing the video decoder of FIG. 2.
Figure 9:
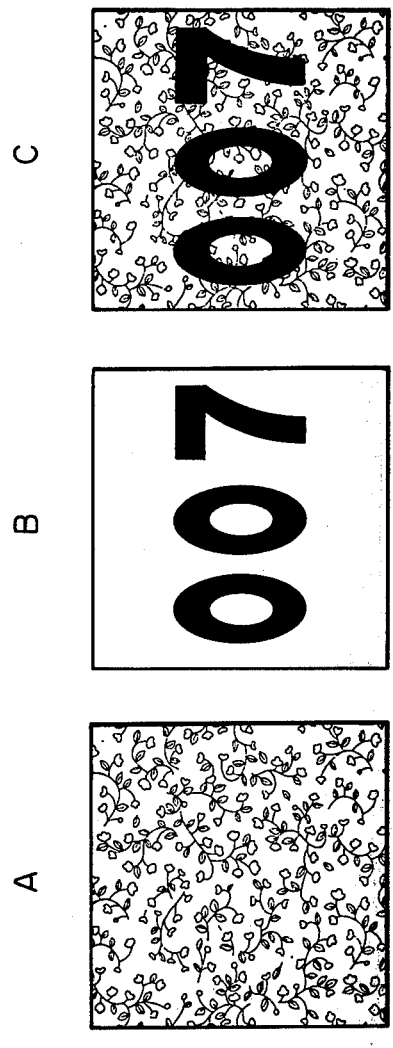
FIG. 9 shows different image patterns which are superimposed one upon another to synthesize a new image pattern.

FIGS. 3 and 9 show a modified form of the present invention in which separate imaged A and B are superimposed one upon another to synthesize a new image. The data file memory 63 contains coded data as previously described. In this example, images A and B are consecutively scanned by the scanner 16 (FIG. 1) so that the line data of images A and B are recorded in alternate fashion. In FIG. 3, the circuits of FIG. 2 are connected in parallel to the data file memory 63 to receive the data output at the same time. Video signals obtained at the output of the circuit of FIG. 2 are applied to a mixer 150 in which the output video signals are combined to for a composite signal which is fed into a scanner 151 to form a superimposed image C.

Figure 10:
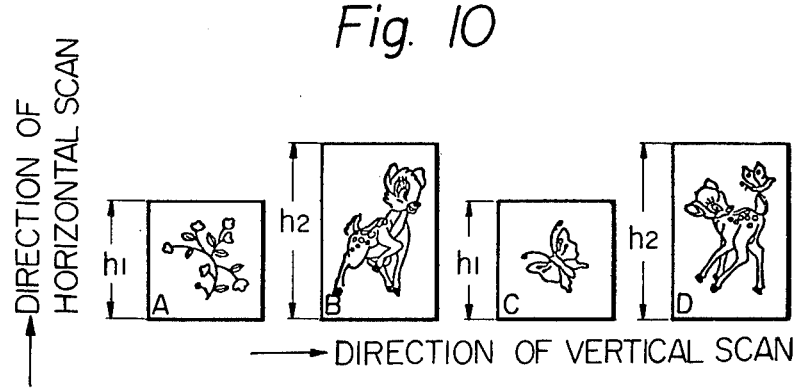
FIG. 10 shows a set of four unit image patterns useful for describing a method for arranging the unit patterns on separate portions of a film.
Figure 11:
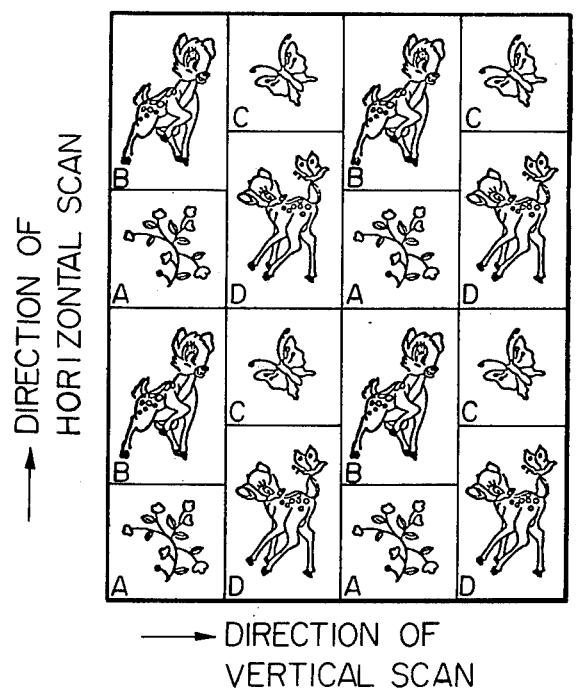
FIG. 11 shows a pattern in which the unit patterns of FIG. 10 are arranged in a predetermined sequence.

A plurality of unit patterns can be arranged in various ways. In FIG. 10, a set of four unit patterns A, B, C and D is shown. Each unit pattern has different heights $h_1$ and $h_2$. In the encoding procedure, each of the patterns is scanned along the direction of allow as indicated in FIG. 10 and in a consecutive manner from A to D, and is characterized by individual color codes. In the decoding procedure using the circuit of FIG. 2, the color code registers A, B, C and D are designed to be coupled to the shift register 110 in the order of A, B, A, B during the first quarter period of the vertical scan, and in the order of D, C, D, C during the second quarter period of the vertical scan, and this process is repeated during the third and fourth quarter periods, as shown in FIG. 11. This permits multiplying the same unit pattern arranged on different areas of the final image, thus making it possible to minimize the number of unit patterns to be employed.

The scanner 98 used to develop images on a photographic film may preferably be constructed of an electrooptic light deflector which is activated by electroacoustic wave to deflect a laser beam. The images so developed on the photographic film are converted into a dot pattern by the use of a dot-patterned aperture plate. This is done by photoetching a photo-resist coated metal plate by subjecting it to a flooding light through the negative and the dot pattern disposed in overlying relation thereto. The metal plate so photoetched is perforated in accordance with the dot pattern bearing the images of the negative. The photoetched metal plate is then used in the subsequent printing process in which a sheet of cloth is covered with the metal plate and printed with dyes.

What is claimed is:

1. A method for separating a colored original into a plurality of images each carrying one of the colors in said original, wherein each of a plurality of line paths within the original is segmented into one or more colored sections and each of the colored sections is characterized by a first code representing the color of the section and a second code representing the length of the section along the line path, and wherein the first and second codes are recorded into a storage medium, the method comprising the steps of:
   a. retrieving a line data comprising the first and second codes derived from a line path from the storage medium;
   b. sequentially detecting the first code representing the same color in a predetermined order;
   c. decoding the second code in succession to recover the length of each color section;
   d. generating a video signal in response to the detection of the first code and in response to the recovered length of said color section which is characterized by the detected first code;
   e. developing an image in response to the video signal on separate areas of a surface in said predetermined order; and
   f. repeating the steps of (a) to (e) when an image of a line path has been developed.

2. A method for separating a colored original into a plurality of images each carrying one of the colors in said original, wherein each of a plurality of line paths within the original is segmented into one or more colored sections and each of the colored sections is characterized by a first code representing the color of the section and a second code representing the length of the section along the line path, and wherein the first and second codes are recorded into a storage medium, the method comprising the steps of:
   a. retrieving a line data comprising the first and second codes derived from a line from the storage medium;
   b. storing the retrieved data in a shift register;
   c. specifying the first codes in turn representing the same color in a predetermined order;
   d. comparing the first code in said shift register with the specified code;
   e. sequentially decoding the second code to recover the length of each color section;
   f. generating a video signal in response to the result of the comparison and in accordance with the recovered length of said color section which is characterized by the specified code;
   g. developing an image in response to the video signal on separate areas of a surface in said predetermined order; and
   h. repeating the steps of (a) to (g) when an image of a line path has been developed.

3. Apparatus for separating a colored original into a plurality of image sections each carrying one of the colors of the original; comprising:
- a shift register for accepting a series of data comprising alternately arranged first and second codes, the first code representing the colors of the original and the second codes representing the length of said image sections along one dimension of said original;
- means for detecting said first codes;
- means for coupling the first code detecting means in turn to the shift register in a predetermined order for selectively detecting the first code representing the same color;
- means coupled to said shift register for decoding the second codes in succession into the length of each said section;
- means responsive to the detection of the first code for generating a video signal representing the length of the section carrying the color represented by the detected code;
- means coupled to the video signal generating means for scanning across a surface to reproduce the image sections in said predetermined order on said surface; and
- means for causing the shift register to repeatedly accept the data during the period of said scanning.

4. Apparatus for separating a colored original into a plurality of image sections each carrying one of the colors of the original, comprising:
- a shift register for accepting a series of data segments each comprising first and second binary digits, the first binary digits representing the colors of the image sections and the second binary digits representing the length of said image sections along one dimension of said original;
- means for detecting said first binary digits;
- means for coupling the first binary digits detecting means in the turn to the shift register in a predetermined order for selectively detecting the first binary digits representing the same color;
- means coupled to the shift register for successively accumulating the second binary digits;
- binary counter means having a plurality of binary digit positions;
- means for comparing the binary digits in said accumulating means and in the binary counter means to provide a coincidence signal;
- means respective to the coincidence signal to shift the shift register to accept the next data segment;
- means responsive to the detection of the first binary digits and to the shifting of the shift register for generating a video signal representing the length of the image section carrying the color respresented by the detected first binary digits;
- means coupled to the video signal generating means for scanning across a surface to reproduce the image section in said predetermined order on said surface; and
- means for causing the shift register to repeatedly accept the same data segments during the period of said scanning.

5. Apparatus for synthesizing an image from a plurality of colored originals, including image sections each carrying one of the colors of the original, comprising:
1. a plurality of image reproducing devices, each device comprising
   a. a shift register for accepting a series of data comprising alternately arranged first and second codes, the first codes representing the colors of the originals and the second codes representing the length of said image sections along one dimension of said original;
   b. means for detecting said first codes;
   c. means for coupling the first codes detecting means in turn to the shift register in a predetermined order for selectively detecting the first code representing the same color;
   d. means coupled to said shift register for decoding the second codes in succession into the length of each said section;
   e. means responsive to the detection of the first code for generating a video signal representing the length of the section carrying the color represented by the detected first code; and
   f. means for causing the shift register to repeatedly accept the data;
2. means coupled to the video signal generating means of said image reproducing devices for mixing the video signals; and
3. means coupled to the mixing means for scanning across a surface to reproduce the image sections of each said original in said predetermined order on said surface.

6. Apparatus for recording an original copy printed with a plurality of predetermined colors, comprising:
- means for scanning along each of a plurality of line paths within the original copy to detect the light reflected therefrom;
- means for translating the detected colors into a first code;
- means for translating the time between successive transitions of color along each of said line paths into a second code; and
- means for recording the first and second codes in sequence.

7. A method for separating a colored original into a plurality of colored images and recovering the colored original from the separated images, comprising:
- segmenting a colored original into a plurality of line paths;
- dividing each of the line paths into one or more line segments of different colors;
- characterizing the color of each line segment with a first code;
- characterizing the length of each line segment with a second code;
- recording the first and second characterizing codes in succession;
- detecting one of the recorded first characterizing codes;
- decoding into a video signal the second code characterizing the length of the line segment whose color is characterized by the detected first code; and
- developing an image in response to the video signal.

* * * * *